A. R. SHAW.
KILLING PEN FOR SLAUGHTER HOUSES.
APPLICATION FILED SEPT. 9, 1907.
904,089.
Patented Nov. 17, 1908.
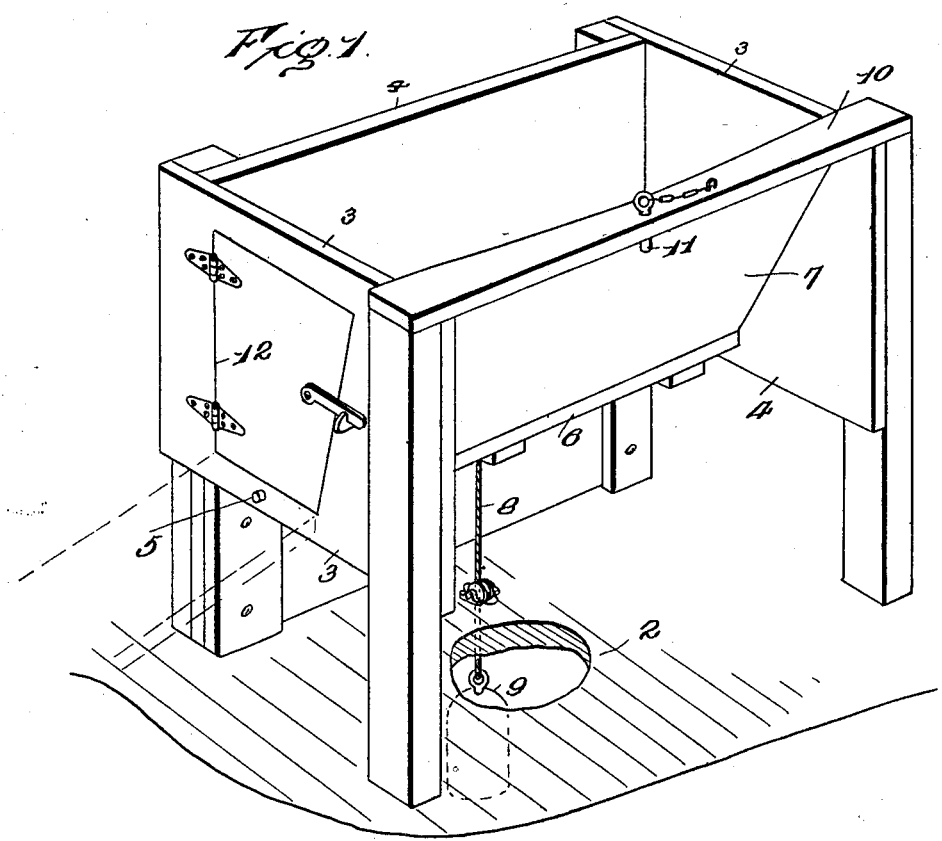
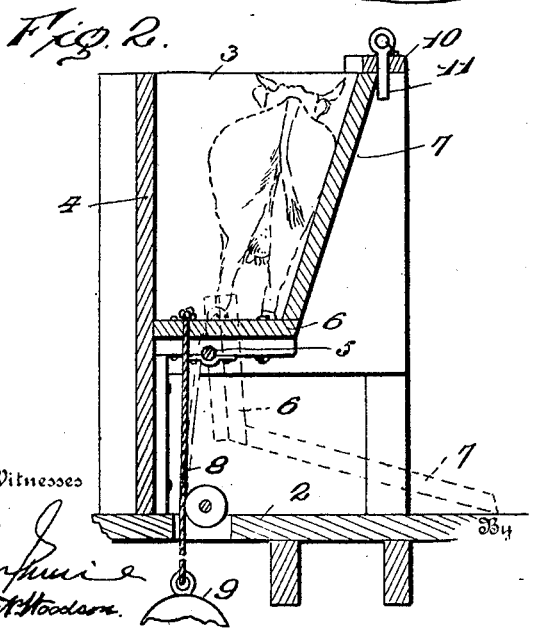

UNITED STATES PATENT OFFICE.

ALEXANDER R. SHAW, OF HELENA, MONTANA.

KILLING-PEN FOR SLAUGHTER-HOUSES.

No. 904,089.          Specification of Letters Patent.          Patented Nov. 17, 1908.

Application filed September 9, 1907. Serial No. 391,973.

*To all whom it may concern:*

Be it known that I, ALEXANDER R. SHAW, citizen of the United States, residing at Helena, in the county of Lewis and Clark and State of Montana, have invented certain new and useful Improvements in Killing-Pens for Slaughter-Houses, of which the following is a specification.

The present invention is in the nature of an improved killing pen for slaughter houses, the said pen being peculiarly designed to admit of the discharge of the animal after being slaughtered. To this end the invention resides principally in the provision of a pen of this character formed with a tilting bottom, novel means being utilized for holding the bottom in normal position and for releasing the same when it is desired to discharge the slaughtered animal.
For a full understanding of the invention and the merits thereof and also to acquire a knowledge of the details of construction and the means for effecting the result, reference is to be had to the following description and accompanying drawings, in which:

Figure 1 is a perspective view of the improved killing pen; and, Fig. 2 is a vertical sectional view through the same.

Corresponding and like parts are referred to in the following description and indicated in all the views of the drawings by the same reference characters.

Referring to the drawings, it will be observed that the killing pen which is supported in an elevated position above the slaughter house floor 2 comprises the two oppositely disposed ends 3 and a side 4, which are disposed in a vertical position and are stationary. Connecting the lower portions of the ends 3 is a longitudinal shaft 5 upon which the bottom 6 of the pen is mounted so as to have a tilting movement. One of the edges of the tilting bottom 6 carries the opposite side 7 of the pen 1, while a cable 8 is pendent from the remaining edge of the bottom and extends through the slaughter house floor 2, a weight 9 being applied to the extremity of the cable 8 for holding the bottom normally in a horizontal position. This bottom 6 is comparatively narrow and the swinging side 7 of the pen is inclined outwardly from the bottom so that when the animal has been killed, it will have a tendency to fall upon the said inclined side and over-balance the weight 9 and tilt the bottom 6. It will be observed that when the said bottom is tilted, the swinging side 7 of the killing pen moves into engagement with the slaughter house floor and forms an inclined plane leading to the latter. A bar 10 connects the ends 3 of the pen and carries a bolt 11 for engaging the swinging side 7 to hold the same in an upright position.

In the operation of the device, the animals are driven into the killing pen through a door 12 in one of the ends 3 and after being slaughtered, fall upon the inclined side 7. The bolt 10 is then withdrawn, whereupon the weight of the dead animal causes the bottom to tilt and swings the side 7 into engagement with the floor 2. As soon as the animal has been removed from the said side 7, the weight 9 operates to move the side again into an upright position where it is engaged by the bolt 11 which is replaced, and the operation repeated.

Having thus described the invention, what is claimed as new is:

1. In a killing pen for slaughter houses, the combination of stationary ends and a stationary side, a tilting bottom pivotally mounted between the ends, a side rigid with the bottom and adapted to swing therewith so as to form when tilted an inclined plane for the discharge of the dead animal, and means for locking the tilting bottom and side in coöperative relation with the stationary ends and side.

2. In a killing pen for slaughter houses, the combination of stationary ends and a stationary side, a tilting bottom pivoted between the stationary ends, a side rigid with the bottom so as to swing therewith, a weight normally tending to swing the tilting bottom and side in coöperative relation with the stationary ends and side, and means for locking the bottom and side in such position.

In testimony whereof I affix my signature in presence of two witnesses.

ALEXANDER R. SHAW. [L. S.]

Witnesses:
 L. F. LA CROIX,
 JOHN H. SHOBER.